United States Patent [19]

Tarbell et al.

[11] 3,978,264

[45] Aug. 31, 1976

[54] COATING FOR POROUS SURFACES

[75] Inventors: Harlan E. Tarbell, Torrance; Donald W. Mogg, Redondo Beach; David L. Ruff, Torrance, all of Calif.

[73] Assignee: Grefco, Inc., Bala Cynwyd, Pa.

[22] Filed: June 20, 1975

[21] Appl. No.: 588,816

[52] U.S. Cl. .................. 428/314; 428/315; 428/320; 428/425; 428/524
[51] Int. Cl.² .................. B32B 3/26; B32B 5/18; B32B 23/00
[58] Field of Search ........... 428/315, 320, 524, 304, 428/314, 321, 425

[56] References Cited
UNITED STATES PATENTS

| | | | |
|---|---|---|---|
| 2,487,060 | 11/1949 | Pike et al. | 428/320 |
| 3,510,391 | 5/1970 | Bolster et al. | 428/320 X |
| 3,533,901 | 10/1970 | Sutker | 428/320 X |

Primary Examiner—Harris A. Pitlick
Attorney, Agent, or Firm—Everett H. Murray, Jr.

[57] ABSTRACT

When a porous substrate such as perlite insulation board is surfaced with a foamed polymer layer formed in place from liquid components, the liquid components will often partially penetrate the surface, resulting in loss of materials and uneven foaming. A barrier coating which can prevent penetration is provided by applying to the porous substrate an aqueous mix of a thermosetting resin which cures through methylol groups, such as urea formaldehyde, with a component containing a hydroxyl group, such as starch, cereal flour, or the like. When the barrier coating is dried, a water insoluble cross-linked surface is formed which is impenetrable to foam constituents. A greater foam thickness is obtained for a given amount of foamable material and a more uniform thickness also results.

10 Claims, No Drawings

COATING FOR POROUS SURFACES

This invention relates to composite products consisting of a porous substrate, a layer of polymeric foam and an optional top skin, produced by applying foamable liquids to the porous substrate, which then foam in place on the substrate. The foam bonds to the substrate and thus serves as its own adhesive. If it is desired to have a top skin on the product, the skin material can be in place over the foaming liquids during the foaming operation so that the foam will bond to the top skin as well as to the substrate. One commercial product produced by this method consists of a perlite insulation board substrate, a layer of polyurethane foam and a top skin which is an asphalt treated felt similar to roofing felt.

In making composite products of the above type, substantial amounts of the liquid precursors of the solid polymer foam will often penetrate the surface of the porous substrate and are effectively lost. Thus, an appreciable cost penalty is involved and, in addition, because penetration varies over the surface of the substrate, a less uniform foam layer is obtained than is desirable.

In this invention a barrier coating is provided which when applied to porous substrates prevents loss of foamable liquids into the substrate. For this coating to perform satisfactorily and result in a composite product of high quality, it must have a number of characteristics in addition to an ability to prevent loss of the liquids. It must adhere strongly to the substrate and must provide a surface to which the foam will strongly adhere. It must not act as a defoamer or in any way interfere with the foaming process. When the composite product is exposed to humid conditions or a combination of high temperature and high humidity, the coating must not be affected in any way that would degrade the durability or performance of the product. In addition, the coating must be formulated in such a way that it can be applied readily by a commercially practical process. It must be a material that can be applied uniformly to the surface of the substrate without soaking excessively into the substrate. It must dry without any cracking or crazing. If the substrate if produced by a wet process such as the perlite board processes disclosed in U.S. Pat. Nos. 2,634,207 and 3,266,974, it is desirable to apply the coating to the substrate prior to the final drying of the substrate, so that the coating and substrate can be dried in the same operation. In this case, the coating must not be so impervious to water vapor that it is damaged by the escaping water vapor or substantially slows the board drying operation. Thus, while the coating must effectively prevent penetration into the substrate of the liquid foam components, if it is applied to the substrate before the substrate is dried it must allow the water in the substrate to escape during drying.

A number of coatings have been tried as barrier coatings in making composite products of the type produced by foaming polyurethane in place on perlite insulation board, either with or without a top skin. Clay based coatings such as asphalt-clay mixtures and the like offer at best limited resistance to penetration. Urea formaldehyde resin coatings crack and craze during drying. When polyvinyl acetate emulsion is applied as a coating to wet process perlite board before the board is dried, it forms an apparently continuous film which delaminates from the surface of the board in large blisters formed by water vapor in the drying operation. Starch and cereal flour coatings offer fair resistance to urethane liquid penetration and present no difficulties in drying, but soften in use upon exposure to humid conditions resulting in delamination of the foam layer from the perlite board.

It has now been found that excellent barrier coatings for perlite board and the like are afforded by components containing cross-linking hydroxyl groups such as starch or cereal flour and the like with thermosetting resins which cure through methylol groups, such as urea formaldehyde resins, phenol formaldehyde resins, melamine formaldehyde resins, mixtures and interpolymers thereof, and the like. Excellent bonds are formed between the barrier coating and substrates containing active hydroxyl or other active hydrogen containing groups, due to cross-linking with the methyol containing resin.

The coating components are combined in an aqueous medium. The aqueous coating mixture may be applied to partially dewatered substrate board, in which case it is dried and cured by the final board oven drying procedure. Alternatively the aqueous coating mixture may be applied to dry substrates. Since the time required to dry the coating applied to a dry substrate is normally quite short, it is highly beneficial in this case to add a catalyst to the coating formulation to accelerate the cure and make sure that curing is complete or nearly so at the end of the short drying period.

The dried and cured barrier coating is substantially impervious to liquid urethane components and is unaffected by exposure to high humidity conditions. As a consequence of the lack of penetration into the porous substrate by the liquids, the foamed urethane layer which is formed is substantially thicker and more uniform in thickness than it would otherwise be.

Instead of forming a thicker urethane foam layer, the quantity of liquid urethane chemicals used to produce the composite product can be reduced to yield the same foam thickness and composite product thickness. Since these chemicals are expensive, the barrier coating of this invention substantially reduces the cost of producing the composite product.

The foaming operation may be carried out, or completed, in equipment which physically restrains the amount of foam rise and thereby controls the thickness of the foam layer and total composite board. In this type of equipment a product which is uniform in thickness can often be produced even if a barrier coating is not used, but the varying penetration of the foam liquids over the surface of the porous substrate can show up as large variations in the density of the foam. In areas where the liquid penetration is high the foam density may be so low that the foam is deficient in compressive strength and other properties. The use of the barrier coating of this invention reduces the amount of chemicals needed to produce a foam layer of any given thickness and average density, and makes the foam layer more uniform in density and properties which are dependent upon density.

When the composite product is being made, the porous substrate is usually beneath the foam layer and the top skin is above the foam layer. However, the product is not necessarily used in this orientation. For example, it can be used in a vertical position or it can be used in a horizontal position with the top skin down.

The layer referred to in this application as the top skin may consist of a relatively thin, flexible material such as asphalt treated felt or asphalt treated paper, or it may consist of a thicker layer, e.g., ¼ inch, ½ inch, or 1 inch of a flexible, semirigid or rigid material. If desired, it may consist of the same material as the substrate, though not necessarily the same thickness. For example, both the top skin and the substrate can be perlite insulation board.

If the top skin is a porous material such as perlite insulation board, the surface which will come into contact with the foaming chemicals may be treated with the barrier coating of this invention, like the foam-contacting surface of the substrate, to prevent loss of chemicals into the top skin.

In producing a composite product consisting of a porous substrate, a layer of foam and a thin, flexible top skin, an alternate method of manufacture is to invert the process so that the former top skin is on the bottom and the substrate is on the top during the foaming operation. Regardless of whether the layer referred to herein as the porous substrate is above or below the foaming chemicals during the process, the barrier coating of this invention can be used to prevent loss of chemicals into the porous layer.

The barrier coating of this invention may be used to produce a variety of composite products, particularly thermal insulation products useful in building construction. It has been found especially useful in producing rigid thermal insulation boards comprising a fire resistant substrate board having expanded perlite as its major ingredient, a layer of rigid polyurethane foam applied to the surface of the substrate board, and a top skin on the polyurethane foam. This product combines synergistically the fire resistance of the perlite board with the superior thermal insulating value of urethane foam and is very useful for roof insulation purposes. Use of the barrier coating decreases the quantity of liquid urethane chemicals required to produce a given amount of the composite board and thereby improves the economics of the manufacturing operation.

In the barrier coating formulation, the component containing hydroxyl groups may be any starch or grain flour or mixtures thereof, but preferably will be of a readily dispersable form, such as pregelatinized starch. While still other hydroxyl-group containing materials might prove desirable in some circumstances, the starch and flour materials are generally preferred because of their ready availability and modest cost.

The methylol-containing polymer will generally be any of the conventional, widely available, and inexpensive thermosetting resins known to the art and to commerce. Such resins will generally be selected from among urea formaldehydes, phenol formaldehydes, and melamine formaldehydes and resins which incorporate combinations of such materials or interpolymers thereof. So long as the resin selected is effective to cross-link the starch or cereal flour, the particular characteristics of the resin are not narrowly significant and the resin may be selected on the basis of cost, availability, or other parameters.

The starch or flour component is simply mixed with the resin in an aqueous medium. The amount of starch or flour component relative to the amount of resin must be great enough so that the coating does not crack during drying, but must be low enough so that the coating has good water resistance and is an excellent barrier to the penetration of foamable liquids. The relative proportions may vary from one part resin solids to about 0.3 to 30, preferably about 4 to 15 parts starch or flour or mixtures thereof, on a weight basis. The amount of water employed is conveniently based on the attainment of a consistency appropriate for the coating procedure to be employed as will be understood by one skilled in the art. The particular technique of applying the coating may be chosen on the basis of convenience, usually dependent on the equipment at hand, and may be by spraying, brushing, rolling, or the like.

The amount of the coating to be applied to the porous substrate will ordinarily be about the minimum amount required to prevent significant penetration of the porous substrate by the liquid components of the foam. The lower limit of effectiveness is five (5) pounds, on a solids basis of barrier coating for each thousand square feet of surface, but it will generally be more reliable to utilize about seven (7) to 14 pounds per thousand square feet to allow for variations in coating uniformity which may result from the particular coating technique employed and the variability of the porous substrate surface.

When the coating is applied to a partially dewatered substrate board, the board is dried and the coating is cured by heating in an oven, usually a forced hot air oven. The temperature - time relationships of drying the board in conventional fashion are effective to cure the coating to the cross-linked barrier condition. Drying is usually conducted at a temperature of at least about 210°F.

The cured barrier coating is firmly adherent to the substrate board and is readily receptive to the foam employed. When the foam-forming materials are applied, in conventional fashion, the barrier coating is readily wet, but substantially no penetration occurs. When the foam has risen and cured, it is found to be of uniform thickness and firmly adhered to the barrier coating. In addition, the foam is found to be substantially thicker than with other barrier coatings which offer a measure of protection, such as a cereal flour coating not cross-linked according to the present invention.

It is desirable to incorporate into the barrier coating a minor amount, on the order of about 0.2% to 5.0% based on solids, of a biocide such as sodium pentachlorophenate or other halophenols and haloaromatics of similar character and function. The biocidal preservative effectively protects the barrier layer, and to an extent the composition board and foam, from microbiological attack.

It has also been noted that the inclusion of sodium pentachlorophenate causes an additional increase in the thickness of the applied foam, particularly if polyurethane is used. It is not understood how or why such an increase is attained, but the sodium pentachlorophenate is the biocide of choice because of the aforementioned increase.

The polymer foam layer may be formed of well known and conventional materials by equally well known and conventional techniques. Such elements do not per se form any part of the present invention and selection of materials and techniques is left to those of ordinary skill in the art.

The operation and effect of the present invention is illustrated for the guidance of those skilled in the art by the following examples which are intended to show the best mode presently contemplated, but are not intended to be construed as limiting the scope of the invention.

EXAMPLE I

A ¾ inch thick perlite insulation board was formed from an aqueous slurry and was partially dewatered. Prior to final drying, the upper surface was coated with 90 pounds per thousand square feet of an aqueous medium having the following composition:

| Component | Amount(parts by weight) |
|---|---|
| Aqueous urea formaldehyde[1] | 1 |
| Cereal flour[2] | 5 |
| Water | 42 |
| Sodium pentachlorophenate[3] | 0.05 |

[1]Borden WW 101-LO - 66.5% solids.
[2]Lauhoff Mills All-Bond 200 cereal flour, ground to less than 200 mesh Tyler Standard.
[3]Monsanto Santobrite The coating was applied by pouring the aqueous slurry onto the partially dewatered board and then running the board under a kiss roll to control the thickness of the coating. After the coating was applied, the board was passed through a forced hot air oven at 400°F with a residence time of 2 hours. After drying, the board was allowed to cool to room temperature and a polyurethane foamable liquid was applied at a level of 175 pounds per thousand square feet, calculated to form a one inch thick foam layer. The polyurethane foam composition was based on a Union Carbide polyol blend which is an amine based polyol with a Freon 11 (trichlorofluoromethane) blowing agent. The composition was foamed and cured by the reaction between PAPI the Upjohn Company's polymeric isocyanate and the polyol blend, whereafter the foam layer was examined. It was found to be exceptionally uniform and had a foam thickness of 1 ¼ inches.

EXAMPLE II

The procedure of Example I was repeated, varying the barrier coating according to the following formulations:

A. The formulation of Example I.
B. The formulation of Example I without the sodium pentachlorophenate.
C. Five parts "All-Bond 200" in 42 parts water.
D. No coating.

The comparative results are shown in the following Table:

TABLE

| Barrier Coating | Foam Thickness |
|---|---|
| A | 1 ¼" |
| B | 1 ⅛" |
| C | 1 1/16" |
| D | 7/8" |

EXAMPLE III

The procedure of Example I was repeated using a phenol formaldehyde resin rather than a urea formaldehyde resin, and by spray rather than kiss roll application.

The foam was a polyisocyanurate foam formed through the reaction of 94 parts of ICI's Hexafoam prepolymer with 6 parts Hexafoam resin activator. A Freon 11 blowing agent was used. The foam was applied at a rate calculated to yield 1 inch of foam. Examination of the cured foam revealed that the thickness was uniformly 1 ¼ inches.

What is claimed is:

1. In a composite product having a polymer foam layer applied to the surface of a porous substrate, the improvement comprising a barrier coating between said surface of said porous substrate and said foam layer wherein said coating comprises a cured, cross-linked formulation of a hydroxyl group containing material selected from the group consisting of starch, cereal grain flour, and mixtures thereof, and a thermosetting resin selected from the group consisting of urea formaldehydes, phenol formaldehydes, melamine formaldehydes, and mixtures and interpolymers thereof which cures through methylol groups.

2. The improvement of claim 1 wherein said formulation further comprises on a solids basis about 0.2 to about 5.0 weight percent of a biocide.

3. The improvement of claim 2 wherein said biocide is selected from the group consisting of halophenols, salts of halophenols, and halogenated aromatics.

4. The improvement of claim 2 wherein said biocide is sodium pentachlorophenate.

5. The improvement of claim 1 wherein said formulation comprises about 0.3 to about 30 parts of said hydroxyl group containing material for each part of said thermosetting resin, on a solids weight basis.

6. The improvement of claim 1 wherein said formulation comprises about four to about fifteen parts of said hydroxyl group containing material for each part of said thermosetting resin, on a solids weight basis.

7. The improvement of claim 1 wherein said foam is a polyurethane foam.

8. The improvement of claim 1 wherein said foam is a polyisocyanurate foam.

9. The improvement of claim 1 wherein said composite product is a rigid substantially flat board product comprising a rigid porous substrate board, said barrier coating applied to the surface of said board, a rigid foam layer applied to the surface of said barrier coating and a top skin on the foam layer.

10. The improvement of claim 9 wherein said substrate board contains at least 50% by weight of expanded perlite and the rigid foam is selected from the group consisting of polyurethane foam and polyisocyanurate foam.

* * * * *